No. 658,863. Patented Oct. 2, 1900.
F. PFEFFER.
PIPE FITTING OR COUPLING.
(Application filed Jan. 17, 1900.)
(No Model.)
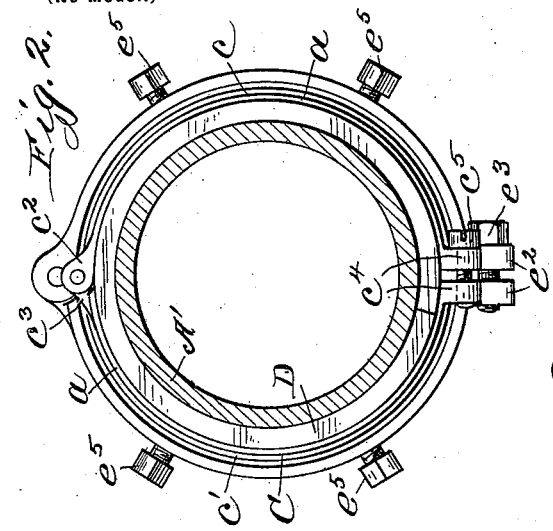
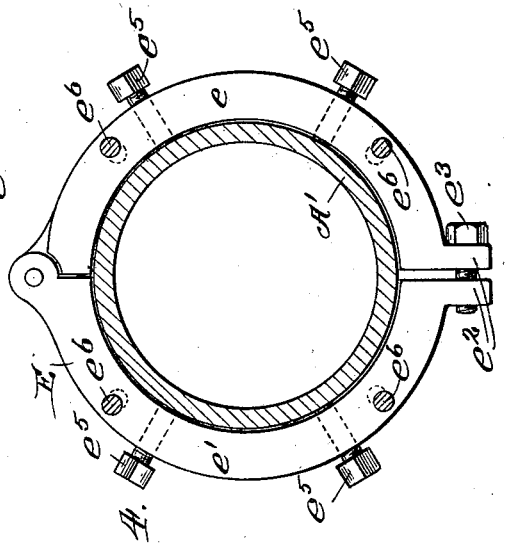
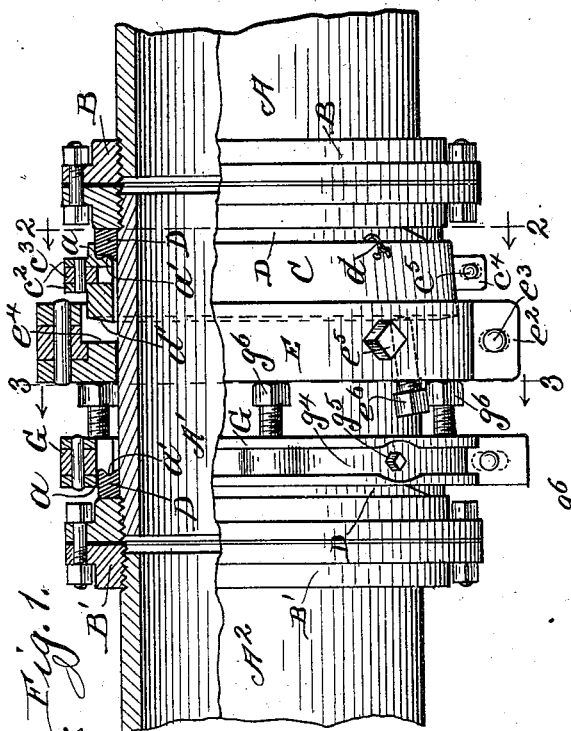
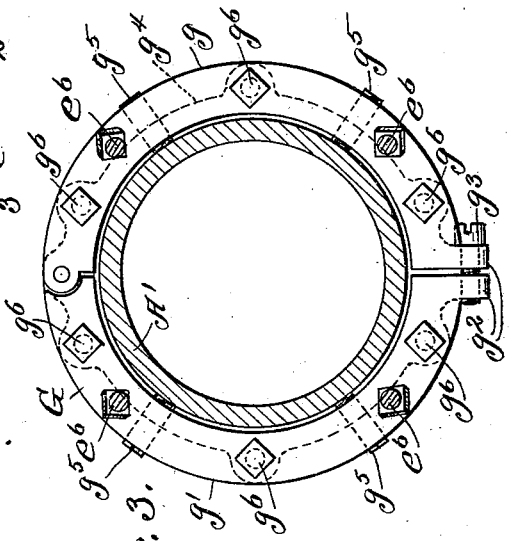
Witnesses:
R. J. Jacker,
E. A. Knight.
Inventor:
Frank Pfeffer.
By Chas. C. Tillman,
Atty.

UNITED STATES PATENT OFFICE.

FRANK PFEFFER, OF CHICAGO, ILLINOIS.

PIPE FITTING OR COUPLING.

SPECIFICATION forming part of Letters Patent No. 658,863, dated October 2, 1900.

Application filed January 17, 1900. Serial No. 1,749. (No model.)

*To all whom it may concern:*

Be it known that I, FRANK PFEFFER, a citizen of the United States, residing at Chicago, in the county of Cook and State of Illinois, have invented certain new and useful Improvements in Pipe Fittings or Couplings, of which the following is a specification.

This invention relates to improvements in fittings or couplings for uniting the ends of steam, water, gas, and other kinds of pipes; and it consists in certain peculiarities of the construction, novel arrangement, and operation of the various parts thereof, as will be hereinafter more fully set forth and specifically claimed.

The object of my invention is to provide simple and effective means to prevent leakage at the pipe-joints.

In order to enable others skilled in the art to which my invention pertains to make and use the same, I will now proceed to describe it, referring to the accompanying drawings, in which—

Figure 1 is a view in side elevation, partly in section, of a pipe-joint, showing my fittings or couplings applied thereto. Fig. 2 is a cross-sectional view, taken on line 2 2 of Fig. 1 of the drawings, looking in the direction indicated by the arrows. Fig. 3 is a similar view, taken on line 3 3 of Fig. 1, looking in the direction indicated by the arrows; and Fig. 4 is a view, partly in section and partly in elevation, showing the main clamp in position on the pipe.

Similar letters refer to like parts throughout the different views of the drawings.

A, A', and $A^2$ represent sections of a pipe, which are secured together by means of collars B and B', of the ordinary or any preferred construction, which engage screw-threads on the adjacent ends of the pieces of pipe, as is usual. On one or both sides of these collars and surrounding the pipe I place a clamp C, which is composed of the members $c$ and $c'$, the member $c$ having a forked end $c^2$ to receive the tongue $c^3$ on the end of the member $c'$, through which ends is passed a pin to pivotally secure them together. Each of these members is provided at its other end with a projection $c^4$, through which is passed a screw $c^5$ to clamp them on the pipe. The surface of the members $c$ and $c'$, adjacent to the collar B, is provided with a rim $a$ at some distance from their inner peripheries and near said peripheries with a bead $a'$, which rims and beads are employed to hold in position and spread the packing D, which is located around the pipe and between the collar B and the adjacent surface of the clamp C, as is clearly shown in Figs. 1 and 2 of the drawings. This packing may be of rubber or other suitable material and is preferably attached to the clamp C by means of pieces of wire $d$, passing through suitable openings in said clamp and the packing. The surface of the members $c$ and $c'$, composing the clamp C opposite the surface adjacent to the collar B, is preferably beveled, as is shown at $d'$, for the purpose presently to be explained.

Located around the pipe, near the clamp C, is a main clamp E, which comprises two members $e$ and $e'$, hinged together at one of their ends and provided with projections $e^2$, through which is passed a screw $e^3$ for securing said ends together. That surface of the members $e$ and $e'$ adjacent to the clamp C is provided with a groove $e^4$ of sufficient size to receive a portion of the clamp C, as is shown in Fig. 1 of the drawings. Located in the clamp E are a number of set-screws $e^5$, which are employed to more firmly secure said clamp on the pipe, and passing obliquely through the clamp E, from one side thereof to the other, are a number of set-screws $e^6$, whose ends rest against the beveled portion $d'$ of the clamp C. By placing the screws $e^6$ obliquely in the clamp E it is apparent that their heads will extend outwardly some distance from the pipe, and thus furnish more room for the operation of a wrench to be used for tightening said screws. Besides, by so placing these screws they will have the effect of pressing the clamp C somewhat toward the pipe, as well as against the packing. Located on the opposite side of the clamp E from that on which the clamp C is placed is a clamp G, which is composed of two members $g$ and $g'$, hinged together at one of their ends and having at their other ends lugs or projections $g^2$, through which is passed a screw $g^3$ to secure them together. The members $g$ and $g'$ of this clamp are provided on their outer surfaces with grooves $g^4$, in which are located set-screws $g^5$, to more firmly secure said clamp to the pipe. That surface of the clamp G adjacent to the packing D for said clamp is provided with an annular flange or rim $a$ and with a bead $a'$ of the same construction and for the same purpose as that shown in the clamp C and above described. Located in the clamp G are a number of screws $g^6$, whose heads in the present instance are shown as resting against the clamp E, and which screws are for the purpose of forcing the clamp G toward the collar B', thus forcing the packing D closely against the pipe and said collar.

By reference to Figs. 1 and 3 of the drawings it will be seen that the clamps C and G fit loosely around the pipe, and this is for the purpose of allowing said clamps to be adjusted against the packing, so as to accommodate any unevenness or inclination of the collars B and B', which are ordinarily put on the pipes without having their surfaces finished and are sometimes out of plumb or not at right angles with the pipe.

Where the space for coupling two joints of pipe is very narrow, I may employ two clamps of a construction similar to that of the clamp G, except that the grooves formed by the rim or flange $a$ and the bead $a'$ are on their opposite sides, in which arrangement the screws $g^6$ will rest against the adjacent surfaces of each of said clamps, so that by turning said screws in the proper direction they will force the clamps apart, and thus press the packing against the collars and pipe, so as to prevent leakage.

Having thus fully described my invention, what I claim as new, and desire to secure by Letters Patent, is—

1. The combination with a collar surrounding the joint of two pipes, of a clamp composed of two members hinged together at one of their ends and having means to secure their other ends together, said clamp located around the pipe near the collar and having an annular flange and an annular bead on its surface adjacent to the collar, a piece of packing located between the collar and clamp, and means to press the clamp against the packing, substantially as described.

2. The combination with a collar surrounding the joint of two pipes, of a clamp composed of two pieces hinged together at one of their ends and having means to secure them together at their other ends, said clamp located around the pipe near the collar and having an annular groove in its surface adjacent to the collar, a piece of packing located between the clamp and collar, a main clamp located on the pipe and having an annular recess to receive the first-named clamp, and a series of set-screws extending obliquely through the main clamp and against the other clamp, substantially as described.

3. The combination with a collar surrounding the joint of two pipes, of a clamp composed of two members hinged together at one of their ends and having means at their other ends to secure them together, said clamp located around the pipe near the collar and having an annular flange and an annular bead on its surface adjacent to the collar and its other surface beveled, a piece of packing located on the pipe near the first-named clamp, and a series of set-screws extending obliquely through the main clamp and against the beveled portion of the other clamp, substantially as described.

FRANK PFEFFER.

Witnesses:
 CHAS. C. TILLMAN,
 E. A. KNIGHT.